(12) United States Patent
Yamamoto (10) Patent No.: US 8,230,205 B2
(45) Date of Patent: Jul. 24, 2012

(54) IMAGE PROCESSING APPARATUS AND PROGRAM STARTING UP METHOD

(75) Inventor: Ryouji Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 443 days.

(21) Appl. No.: 12/552,441

(22) Filed: Sep. 2, 2009

(65) Prior Publication Data

US 2010/0070750 A1    Mar. 18, 2010

(30) Foreign Application Priority Data

Sep. 12, 2008  (JP) ................. 2008-235685
Jun. 23, 2009  (JP) ................. 2009-149202

(51) Int. Cl.
*G06F 9/00*     (2006.01)
*G06F 9/24*     (2006.01)
*G06F 15/177*   (2006.01)
*B41J 2/01*     (2006.01)
*B41J 2/385*    (2006.01)
*B41J 2/32*     (2006.01)
*B41J 2/435*    (2006.01)

(52) U.S. Cl. ............. 713/1; 713/2; 713/100; 347/1; 347/111; 347/171; 347/224

(58) Field of Classification Search ............. 713/1, 2, 713/100; 347/1, 111, 171, 224
See application file for complete search history.

(56) References Cited

U.S. PATENT DOCUMENTS

| | | | | |
|---|---|---|---|---|
| 5,657,448 | A  * | 8/1997  | Wadsworth et al. | 709/220 |
| 7,212,306 | B2 * | 5/2007  | Chrisop et | 358/1.16 |
| 7,590,979 | B2 * | 9/2009  | Klave et al. | 717/163 |
| 7,886,138 | B2 * | 2/2011  | Ferlitsch | 713/1 |
| 8,046,756 | B2 * | 10/2011 | Okutsu et al. | 717/178 |
| 2004/0205261 | A1 * | 10/2004 | Osada | 710/8 |
| 2006/0020935 | A1 * | 1/2006  | Tran et al. | 717/162 |
| 2007/0171449 | A1 * | 7/2007  | Tanno et al. | 358/1.13 |
| 2007/0206211 | A1 | 9/2007  | Okutsu et al. | |
| 2007/0220501 | A1 | 9/2007  | Yanagawa et al. | |

FOREIGN PATENT DOCUMENTS

| | | |
|---|---|---|
| JP | 2007-194876 | 8/2007 |
| JP | 2007-199773 | 8/2007 |
| JP | 2007-249480 | 9/2007 |
| JP | 4189894 | 12/2008 |

* cited by examiner

*Primary Examiner* — Ji H Bae (74) *Attorney, Agent, or Firm* — IPUSA, PLLC (57) ABSTRACT

An image processing apparatus has first through n-th pluralities of programs which, when executed by a computer processor, perform respectively first through n-th functions of the image processing apparatus, where n denotes an integer more than 1, and starts up, on a function-by-function basis, the first through n-th pluralities of programs respectively corresponding to the first through n-th functions. The image processing apparatus starts up, in a predetermined sequence, respective programs included in any one plurality of programs among the first through n-th pluralities of programs to a state in which the plurality of programs performs a corresponding function.

8 Claims, 9 Drawing Sheets

| PROGRAM NAME | CHARACTER 1 | CHARACTER 2 | CHARACTER 3 |
|---|---|---|---|
| aaa.jar | STARTING UP ORDER: 1 | STARTING UP TIME: 10s | SIZE: 10MB |
| bbb.jar | — | STARTING UP TIME: 15s | SIZE: 5MB |
| ccc.jar | — | STARTING UP TIME: 20s | SIZE: 15MB |

FIG.4

| IDENTIFICATION INFORMATION | GROUP | STARTING UP ORDER |
|---|---|---|
| fr | FRAMEWORK | 1 |
| c | COPY | 2 |
| fa | FACSIMILE | 3 |
| p | PRINTER | 4 |
| o | OTHER | 5 |

IMAGE PROCESSING APPARATUS AND PROGRAM STARTING UP METHOD

BACKGROUND OF THE INVENTION

1. Field of the Invention

The present invention relates to starting up of programs which, when executed by a computer processor, perform functions of an image processing apparatus, and relates to starting up of programs in each function unit.

2. Description of the Related Art

In a multifunction peripheral (MFP), each of a copy function, a printer function, a facsimile function and so forth, is available after power is turned on, and a program is started up. Recently, as a result of a function being added to a multifunction peripheral, the time required for starting up a corresponding program may increase, and thus, the time required until a user can actually use a function of the multifunction peripheral may problematically increase.

In order to solve such a problem, only a program for displaying a menu page is started up prior to starting up a program corresponding to a function, and then, after a function is selected by a user from the menu page, the program corresponding to the thus-selected function is actually started up.

However, in this way, although a time required for starting up the program for displaying the menu page is short, a response time required from then may be long.

Japanese Laid-Open Patent Application No. 2007-199773 discloses that, in a digital multifunction peripheral, a function desired by a user is made to be available immediately after power is turned on. Thus a user's waiting time is reduced, and also, convenience for turning on power or for returning from a power save state, improves.

However, in the art of Japanese Laid-Open Patent Application No. 2007-199773, functions to be started up with priority are fixed, and there is no description as to how to handle the other functions.

SUMMARY OF THE INVENTION

An object of the present invention is to provide an image processing apparatus and a program starting up method, whereby a starting up time for a program having priority can be reduced.

According to the present invention, an image processing apparatus has first through n-th pluralities of programs which, when executed by a computer processor, perform respectively first through n-th functions of the image processing apparatus, where n denotes an integer more than 1, and a program starting up control part configured to start up, on a function-by-function basis, the first through n-th pluralities of programs respectively corresponding to the first through n-th functions. The program starting up control part is configured to start up, in a predetermined sequence, respective programs included in any one plurality of programs among the first through n-th pluralities of programs to a state in which the plurality of programs performs a corresponding function.

Other objects, features and advantages of the present invention will become more apparent from the following detailed description when read in conjunction with the accompanying drawings.

DETAILED DESCRIPTION OF THE PREFERRED EMBODIMENTS

With reference to the figures, a preferred embodiment will be described.

Hardware Configuration Example of Image Processing Apparatus in Embodiment

Figure 1:
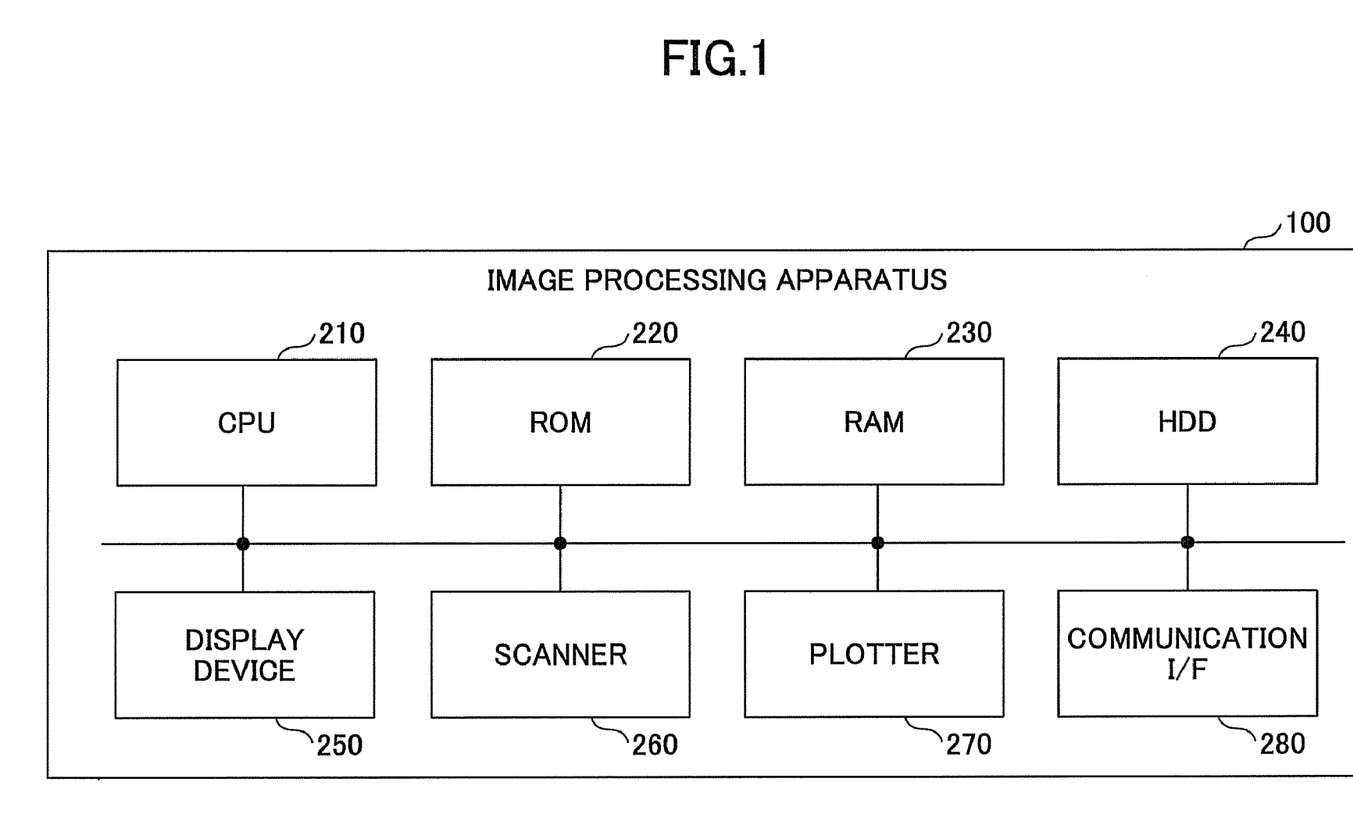
FIG. 1 depicts one example of a hardware configuration of an image processing apparatus in an embodiment of the present invention.

With reference to FIG. 1, an example of a hardware configuration of an image processing apparatus 100 in an embodiment will now be described.

The image processing apparatus 100 includes a CPU (Central Processing Unit) 210, a ROM (Read-Only Memory) 220, a RAM (Random Access Memory) 230, a HDD (Hard Disk Drive) 240, a display device 250, a scanner 260, a plotter 270 and a communication I/F (InterFace) 280.

The CPU 210 executes a program stored in the ROM 220, processes data loaded to the RAM 230 according to instructions of the program, and controls the entirety of the image processing apparatus 100. The RAM 230 temporarily holds processed data during a program or data being loaded and the data being processed, when the program stored in the ROM 220 is executed by the CPU 210.

The HDD 240 stores an OS (Operation System) which is basic software, application programs and so forth, together with associated data. In the embodiment, attribute information 150 and starting up information 160, which will be described later, are stored in the HDD 240.

The display device 250 includes hardware key switches, an LCD (Liquid Crystal Display) and so forth, and provides a user interface used when a user uses functions of the image processing apparatus 100 or carries out various setting up operations. The scanner 260 is used to obtain image data. The plotter 270 is used to output image data to paper.

The communication I/F 280 provides an interface used for sending and receiving information (data) to/from a peripheral (a personal computer, an image processing apparatus or such) which is connected via a wireless or wired communication network and has a communication control function. The image processing apparatus 100 in the embodiment is connected to a LAN (Local Area Network), and sends and receives data to/from an apparatus also connected to the LAN according to a communication protocol such as a TCP/IP (Transmission Control Protocol/Internet Protocol). The image processing apparatus 100 is connected to a telephone line via the communication I/F 280, and sends and receives image data in facsimile.

Respective parts of the image processing apparatus 100 which will be described later with reference to FIG. 2 may be realized as a result of the CPU 210 executing corresponding programs stored in the ROM 220 or HDD 240, or, may be realized as a result of corresponding hardware being provided.

Operation Principle of Image Processing Apparatus in Embodiment

Figure 2:
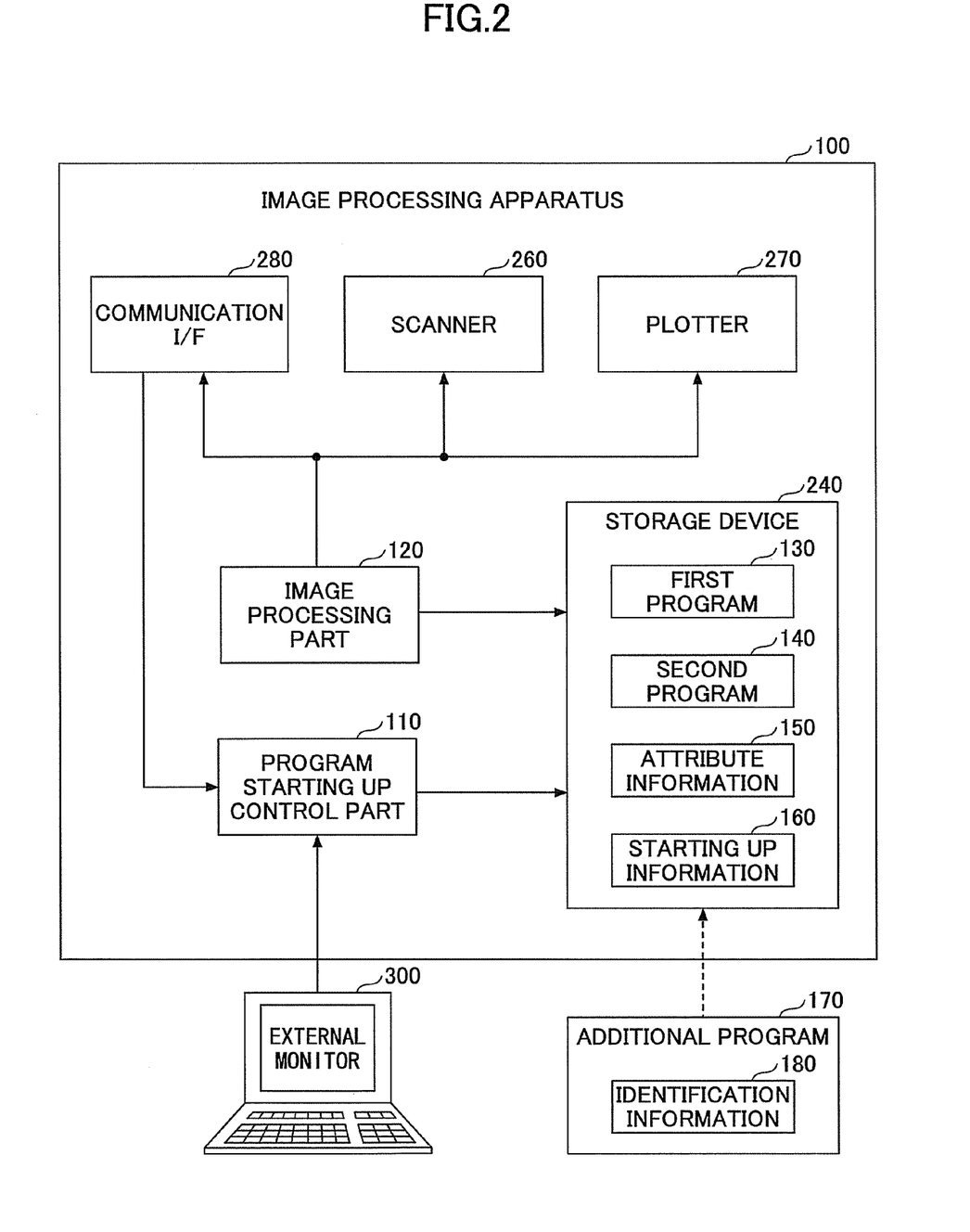
FIG. 2 illustrates an operation principle of the image processing apparatus in the embodiment.

With reference to FIG. 2, an operation principle of the image processing apparatus 100 will be described.

As depicted in FIG. 2, the image processing apparatus 100 includes a program starting up part 110, an image processing part 120, a storage device 240, the scanner 260, the plotter 270 and the communication I/F 280. The storage device 240 includes a first plurality of programs 130, a second plurality of programs 140, attribute information 150, and starting up information 160. Each plurality of programs of the first plurality of programs 130 and the second plurality of programs 140 is a plurality of programs which, when executed by the CPU 210 (not depicted in FIG. 2), performs a function of the image processing apparatus 100. For example, the first plurality of programs 130 or the second plurality of programs 140 may be a plurality of programs which performs a copy function, a plurality of programs which performs a facsimile function, or a plurality of programs which performs a printer function. Once all the programs included in a plurality of programs which performs any one function of the image processing apparatus 100 are started up, the plurality of programs can perform the function of the image processing apparatus 100 for a user.

Figure 3:
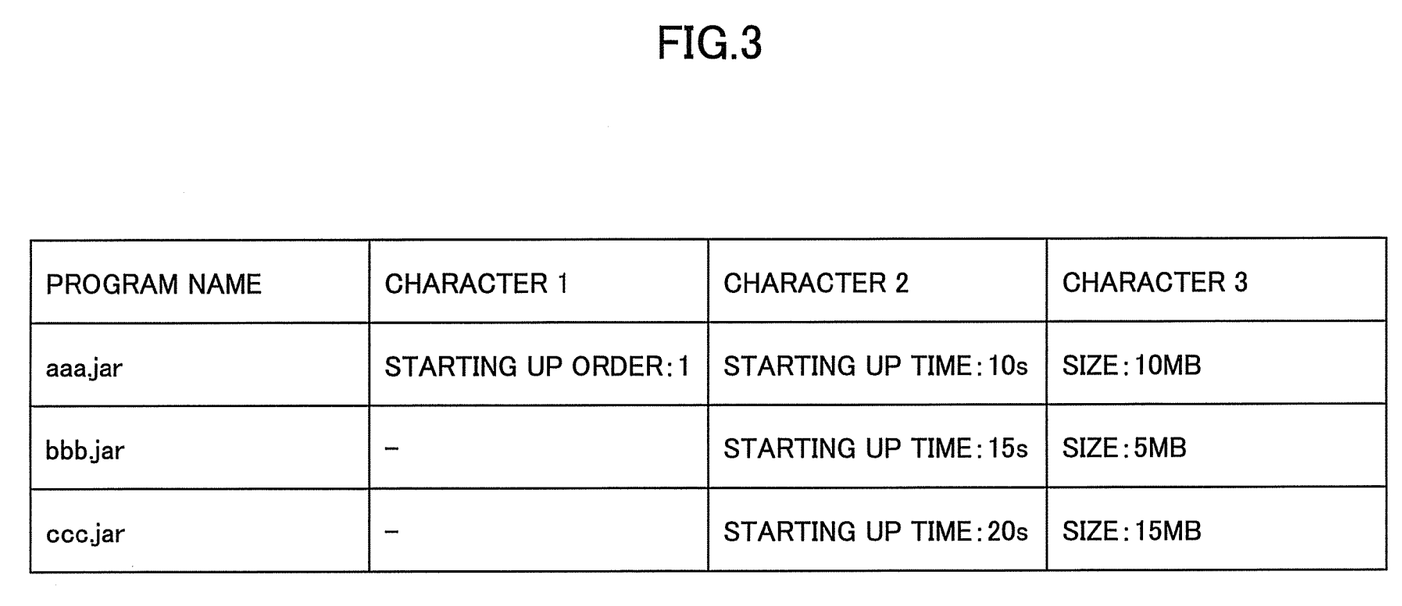
FIG. 3 depicts one example of attribute information in the embodiment.
Figure 4:
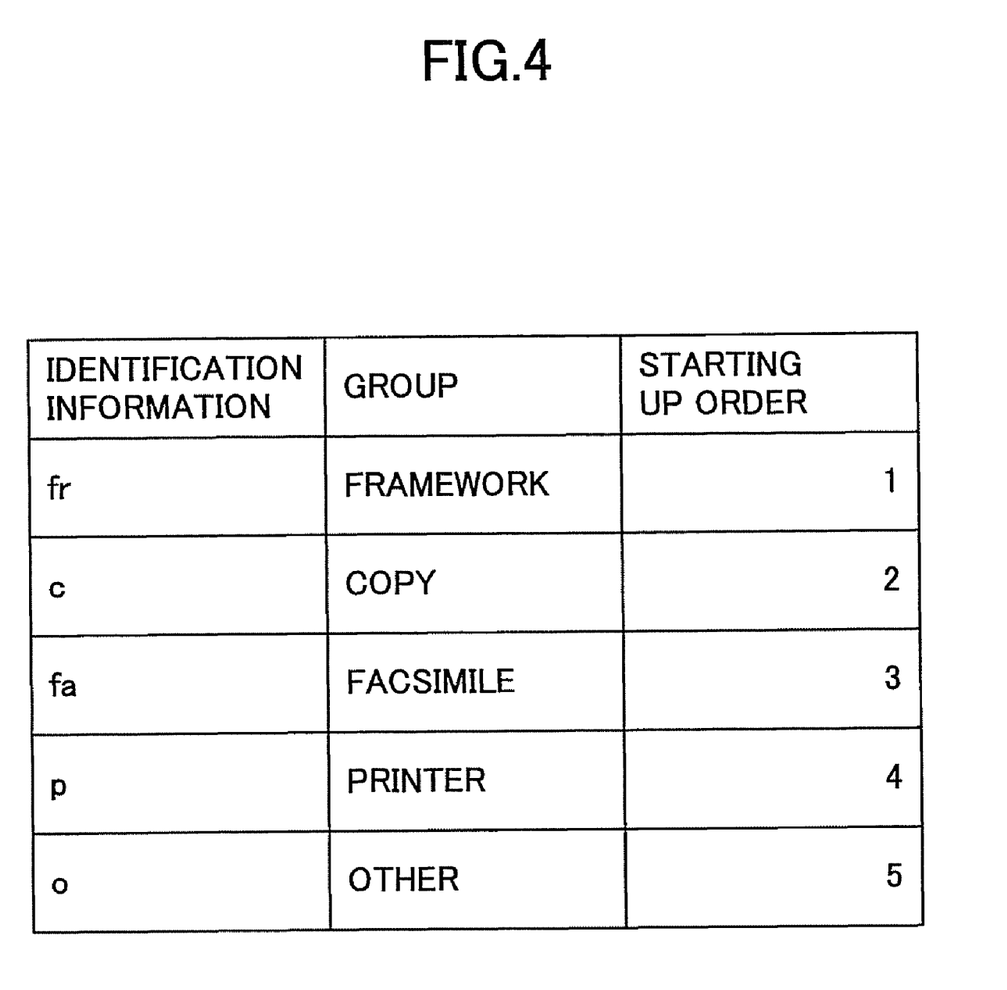
FIG. 4 depicts one example of starting up information in the embodiment.

The attribute information 150 is a database (referred to as DB, hereinafter) which holds a name and characters of any one program as depicted in FIG. 3. Characters of any one program may include, as depicted in FIG. 3, a starting up order, a starting up time, a size, and so forth, concerning the program. The starting up information 160 is a DB which holds identification information of each program, a corresponding function of the image processing apparatus 100, and an order in which the program is started up for performing the function, in such a manner that the identification information of each program, the corresponding function of the image processing apparatus 100, and the order in which the program is started up for performing the function are associated with each other, as depicted in FIG. 4. A first line in FIG. 4 depicts that a program having identification "fr" belongs to a function group "framework (CMP (component))", and a plurality of programs corresponding to the function "framework" has a starting up order of "1 (first)". A third line in FIG. 4 depicts that a program having identification "fa" belongs to a function group "facsimile (CMP (component))", and a plurality of programs corresponding to the function "facsimile" has a starting up order of "3 (third)". That is, in an example of FIG. 4, a starting up order of the pluralities of programs corresponding to respective functions is, "framework CMP"→"copy CMP"→"facsimile CMP"→"printer CMP"→"other CMP". "CMP" means a component as a collection of software components.

The program starting up control part 110 starts up the plurality of programs corresponding to the copy function which then performs the copy function, starts up the plurality of programs corresponding to the facsimile function which then performs the facsimile function, and/or starts up the plurality of programs corresponding to the printer function which then performs the printer function. Once the plurality of programs corresponding to the copy function is thus started up, a user can use the copy function of the image processing apparatus 100. Similarly, once the plurality of programs corresponding to the facsimile function is thus started up, a user can use the facsimile function of the image processing apparatus 100. Similarly, when the plurality of programs corresponding to the printer function is thus started up, a user can use the printer function of the image processing apparatus 100. The program starting up control part 110 starts up the pluralities of programs corresponding to the respective functions of the image processing apparatus, on a function-by-function basis.

Figure 5:
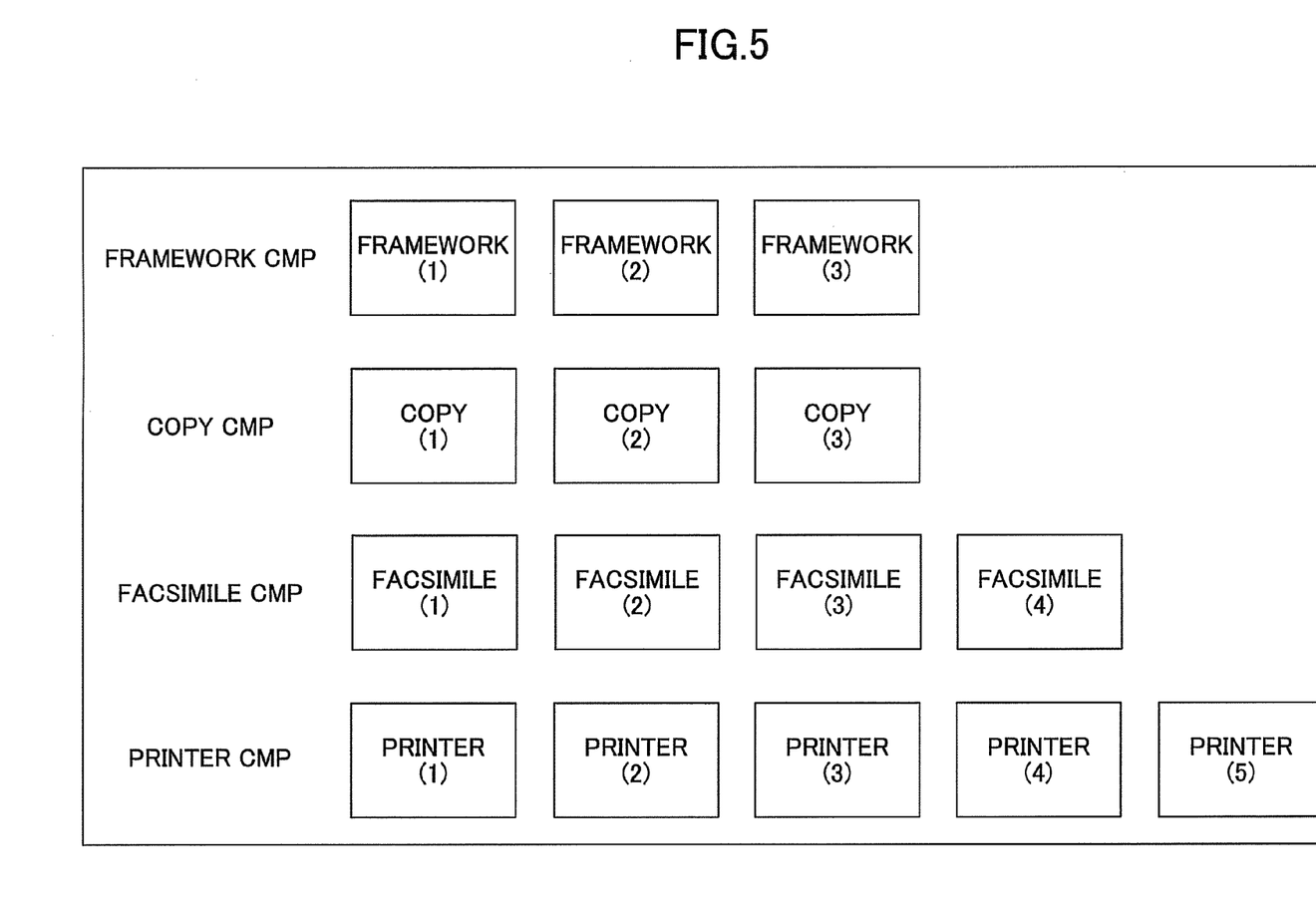
FIG. 5 illustrates starting up processing in a related art.

As depicted in FIG. 5, in the related art, an image processing apparatus starts up programs corresponding to all the functions of the image processing apparatus in a lump. That is, the image processing apparatus in the related art starts up all the programs in a single process. Therefore, even when a user wishes to use a particular function to be performed prior to another function (or wishes to use a particular function as soon as possible), the user cannot use any particular one of the functions of the image processing apparatus until all programs of all functions are started up.

On the other hand, in the embodiment of the present invention, the program starting up control part 110 groups the programs according to the respective functions of the image processing apparatus 100 to which they belong, and starts up the programs on a function-by-function basis. That is, the program starting up control part 110 starts up, as a single process, the programs included in the plurality of programs assigned to one of the functions of the image processing apparatus 100. Therefore, it is possible to reduce a starting up time of the plurality of programs corresponding to a particular function which a user wishes to use prior to another function, for example. Further, even when an error occurs in a process of starting up the plurality of programs corresponding to a particular function, the plurality of programs corresponding to another function can be started up without any problem (or with a small influence from the error).

The program starting up control part 110 starts up the pluralities of programs corresponding to the respective functions according to the starting up order of the respective functions defined by the starting up information 160 depicted in FIG. 4, for example. In the example of FIG. 4, the program starting up control part 110 starts up the pluralities of programs for the respective functions in the starting up order of "framework CMP"→"copy CMP"→"facsimile CMP"→"printer CMP"→"other CMP".

Figure 7:
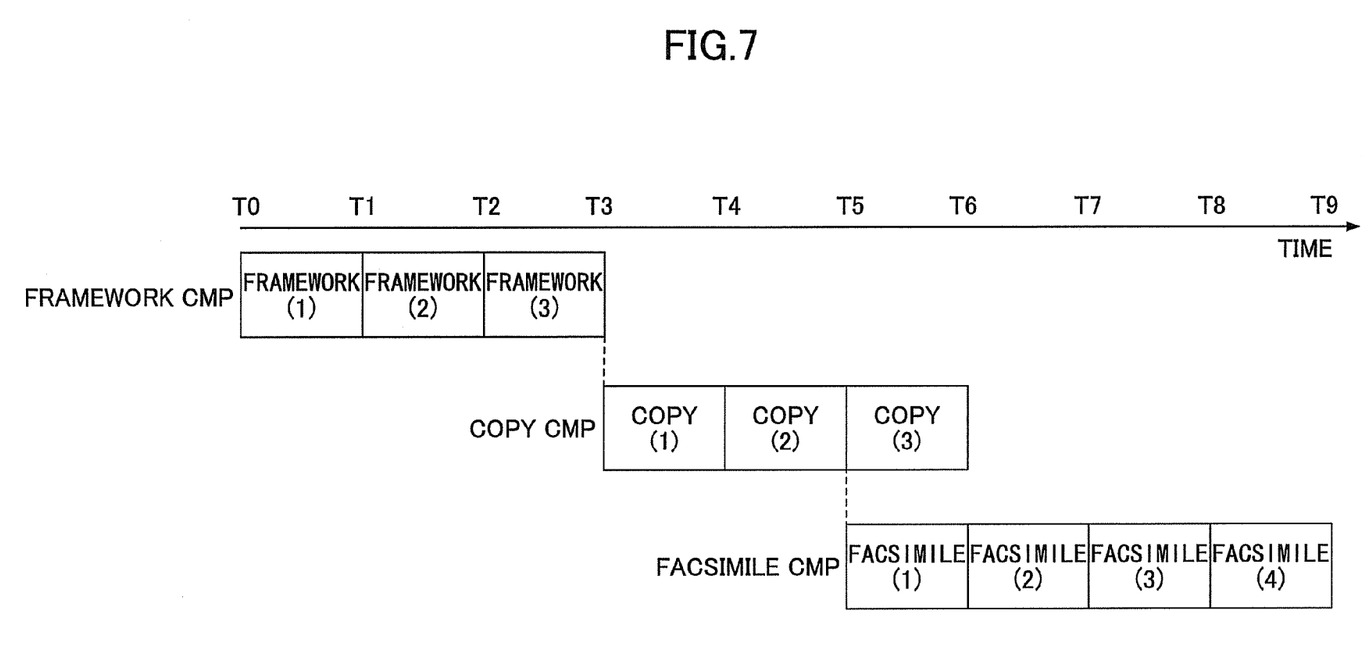
FIGS. 7 and 8 illustrate starting up processing in the embodiment in time series manner.
Figure 8:
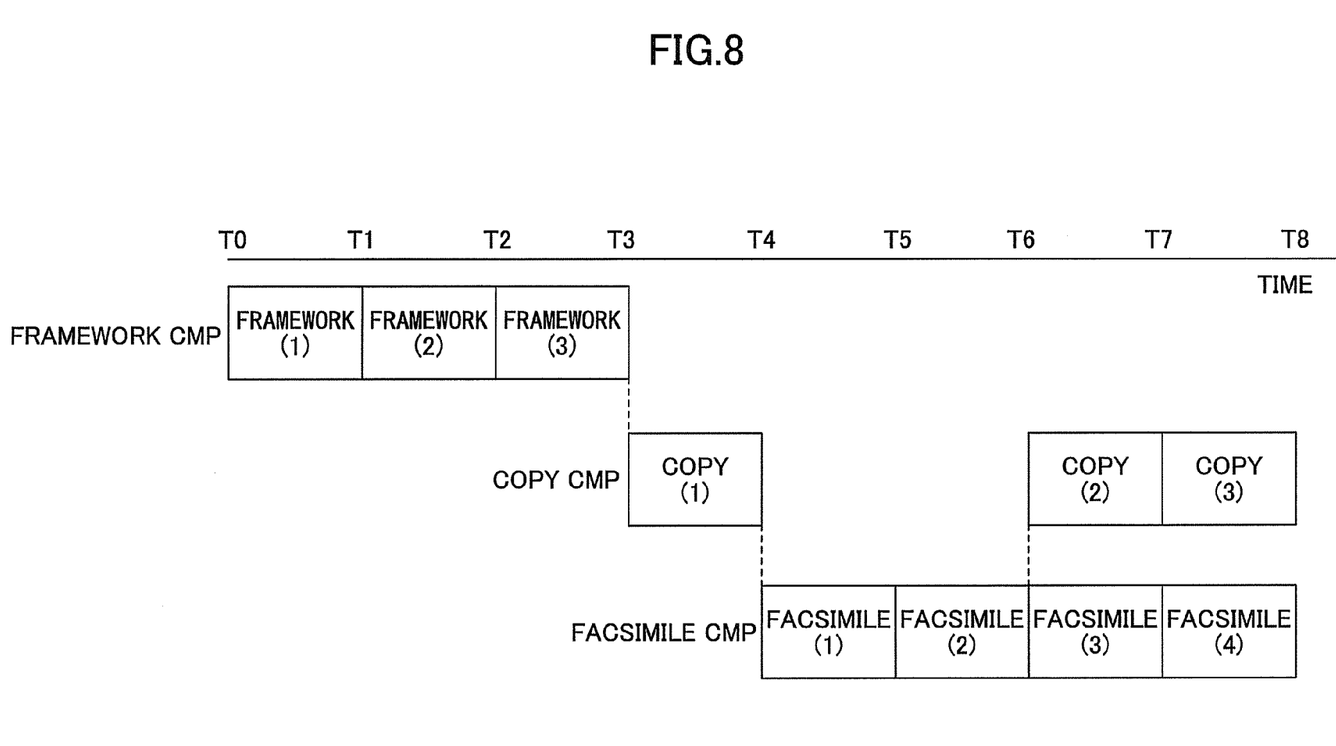

FIG. 7 shows an example of the starting up order. As depicted in FIG. 7, the program starting up control part 110 starts up a program "framework (1)" which is a part of the framework CMP, at a time T0. Subsequently, the program starting up control part 110 starts up a program "framework (2)" and a program "framework (3)", in the stated order, which programs are parts of the framework CMP. Then, after the completion of the starting up of the program "framework (3)" at a time T3, the program starting up control part 110 starts up a program "copy (1)" which is a part of the copy CMP having the starting up order "2" as depicted in FIG. 4. Thus, as depicted in FIG. 7, at a time T6, all the programs corresponding to the copy CMP have been started up. Therefore, a user can use the copy function of the image processing apparatus 100 after the time T6. It is noted that, in examples of FIG. 7 and the later-described example of FIG. 8, the framework CMP includes three programs, i.e., programs "framework (1)", "framework (2)", and "framework (3)". The copy CMP includes three programs, i.e., programs "copy (1)", "copy (2)", and "copy (3)". The facsimile CMP includes four programs, i.e., programs "facsimile (1)", "facsimile (2)", "facsimile (3)" and "facsimile (4)".

In the example of FIG. 7, once having completed starting up of the program "copy (2)" at a time T5, the program starting up control part 110 starts up the program "facsimile (1)" which is a part of the facsimile CMP having the starting up order of "3" depicted in FIG. 4. Thus, as depicted in the FIG. 7 example, at a time T9, all of the programs corresponding to the facsimile CMP have been started up. Therefore, a user can use the facsimile function of the image processing apparatus 100 after the time T9.

The timing to start starting up of each program which is a part of a CMP may be determined appropriately. In the above-mentioned example, starting up of "copy (1)" is started after starting up of the "framework (3)" has been finished, and starting up of "facsimile (1)" is started after starting up of the "copy (2)" has been finished.

The program starting up control part 110 may suspend starting up of the copy CMP having an earlier starting up order (starting up order: 2), and start up a program of the facsimile CMP having a later starting up order (starting up order: 3). That is, prior to or during a starting up operation assigned to the copy CMP, process priority may be changed so that the program starting up control part 110 suspends the starting up operation assigned to the copy CMP, and starts a starting up operation assigned to the facsimile CMP. For example, although a time at which the facsimile function becomes available is the time T9 in the example of FIG. 7, a time at which the facsimile function becomes available is the time T8 in the example of FIG. 8. Thus, it is possible to reduce a starting up time for a function desired to be performed with priority, for example, the facsimile function of FIG. 8. It is noted that, in the example of FIG. 8, a starting up operation of "copy (2)" is started at a time of T6. However, a starting up operation of "copy (2)" may be started instead at a time of T8 after starting up of "facsimile (4)" is finished. It is noted that, in the examples of FIGS. 7 and 8, time periods required for starting up programs included in CMPs are fixed whether the programs included in the CMPs are started up together in parallel, for purposes of simplification. Actually, time periods required for starting up programs included in CMPs may increase accordingly when the programs included in the CMPs are started up together in parallel.

Figure 6:
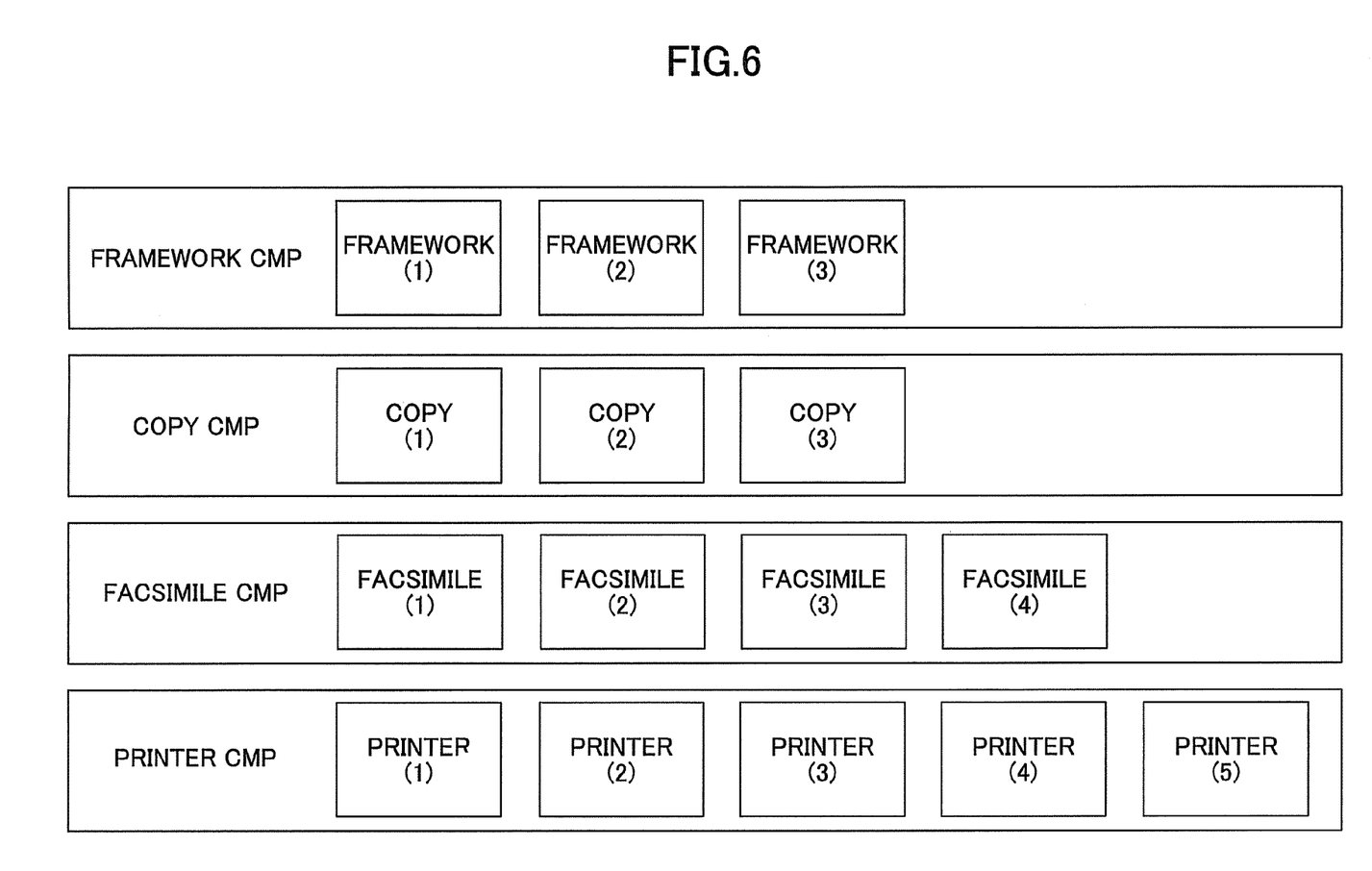
FIG. 6 illustrates starting up processing in the embodiment.

Further, the program starting up control part 110 may start up a common program as being of another CMP in a case where there is a common program which is common among the pluralities of programs corresponding to respective ones of the functions such as "copy CMP", "facsimile CMP" and "printer CMP", depicted in FIG. 6. For example, in a case where "copy (1)", "facsimile (1)" and "printer (1)" are a common program, the program starting up control part 110 may incorporate the common program into the framework CMP, or may create a new function group, and start up the common program separately from starting up of the CMP to which the common program originally belongs. A common program such as the above-mentioned program common among the "copy (1)", "facsimile (1)" and "printer (1)" may be, for example, an interface program used for reading from or writing to an external recording medium, a program used for transferring data from a data input side to a data output side, or a program of the framework CMP.

When a program is newly installed in the image processing apparatus 100, the newly installed program 170 has identification information 180 for identifying the program 170 itself. The identification information 180 may be a file name of the program, or may be described in the program. Further, the identification information 180 may be information indicating a place at which the program is stored in the HDD 240.

The program starting up control part 110 uses the starting up information 160 depicted in FIG. 2, and searches for a function group to which the newly installed program 170 belongs, based on the identification information 180 of the newly installed program 170. When starting up programs, the program starting up control part 110 starts up the newly installed program 170 as a part of the function group to which it corresponds in FIG. 4. It is noted that, the identification information "fr (framework)", "c (copy)", "fa (facsimile)", "p (printer)", and "o (other)" depicted in FIG. 4 may be other character strings. In one example, a configuration may be provided such that, in a case where the starting up information 160 does not indicate that the identification information 180 of the newly installed program 170 is stopped, the program starting up control part 110 recognizes that the newly installed program 170 is a program for a new function.

In another example, the program starting up control part 110 determines a function group to which the newly installed program 170 belongs by reading the attribute information 150 concerning the newly installed program 170. For example, in a case where the newly installed program 170 has a program name "aaa.jar" which is already included in the attribute information as depicted in FIG. 3, the program starting up control part 110 reads the attribute information 150 concerning the program name "aaa.jar", and determines that the newly installed program "aaa.jar" 170 belongs to the framework CMP based on the information of the character 1. In another example, the program starting up control part 110 reads the starting up time of a program which is the character 2 depicted in FIG. 3, or the size of a program which is the character 3 depicted in FIG. 3, and may determine a function group to which the newly installed program 170 belongs. Then, the program starting up control part 110 may start up the newly installed program 170 as a part of the corresponding function group.

It is noted that, the attribute information 150 concerning the newly installed program 170 may be installed in the image processing apparatus 100 simultaneously with installation of the program 170, or, may be set in the image processing apparatus 100 separately after the installation of the program 170.

The image processing part 120 depicted in FIG. 2 provides the copy function, the facsimile function, the printer function, or such, having been started up, in response to a user's request. For example, when receiving a user's request for performing the copy function, the image processing part 120 uses the scanner 260, obtains image data of an original, and outputs the obtained image data to paper from the plotter 270. Further, when receiving a user's request for performing the facsimile function, the image processing part 120 uses the scanner 260, obtains image data of an original, and transmits the obtained image data to a designated destination from the communication I/F 280. When receiving a user's request for performing the printer function, the image processing part 120 obtains image data from the communication I/F 20, and outputs the obtained image data to paper from the plotter 270.

Based on the above-described operation principle, the image processing apparatus 100 in the embodiment can reduce a starting up time for a function to be performed with priority.

Starting Up and Image Forming by Image Processing Apparatus in Embodiment

Figure 9:
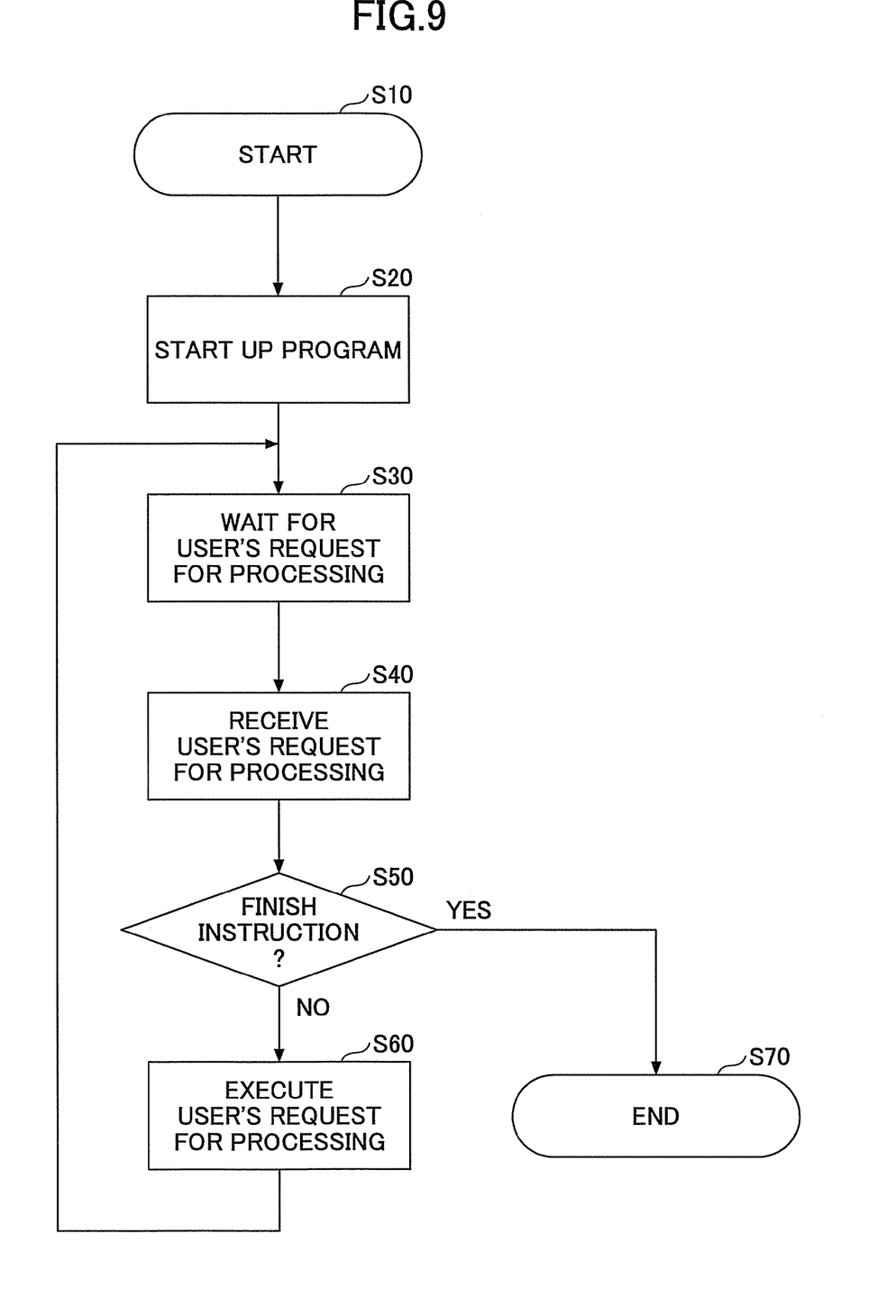
FIG. 9 depicts a flow chart of one example of starting up processing and image forming processing in the image processing apparatus in the embodiment.

With reference to FIG. 9, one example of starting up and image forming of the image processing apparatus 100 in the embodiment will be described. FIG. 9 depicts a flow chart of one example of starting up and image forming of the image processing apparatus 100 in the embodiment.

In FIG. 9, the image processing apparatus 100 starts a starting up operation in step S10. In step S20, the program starting up control part 110 starts up the plurality of programs corresponding to the framework function, the plurality of programs corresponding to the copy function, the plurality of programs corresponding to the facsimile function, the plurality of programs corresponding to the printer function and the plurality of programs corresponding to the other function of the image processing apparatus 100 according to the starting up information 160 depicted in FIGS. 3 and 4 into such a state that the respective functions can be used by a user. The program starting up control part 110 starts up the plurality of programs corresponding to each function, on a function-by-function basis, that is, the framework function, the copy function, the facsimile function, the printer function and the other function, in the stated order.

The program starting up control part 110 starts up, in sequence, the plurality of programs assigned to one function of the image processing apparatus 100 as a single process, the plurality of programs assigned to another function of the image processing apparatus 100 as a single process, and so on, as depicted in FIG. 6. Thereby, it is possible to avoid, for starting up of programs for one function, an influence of a trouble occurring with starting up of programs for another function.

Further, as mentioned above, the program starting up control part 110 starts up the plurality of programs for each function for example according to the starting up order depicted in FIG. 4. As to the starting up order depicted in FIG. 4, a user can cause the program starting up control part 110 to change the starting up order from the display device 250 depicted in FIG. 1 by designating a new starting up order. Further, by designating a new starting up order from the communication I/F 280 (via the Internet, for example), or from the external monitor 300 (via an external input), a user can cause the program starting up control part 110 to change the starting up order. By thus changing the starting up order of FIG. 4 as necessary or desired by the user, starting up of programs according to the user's needs to use a specific function with priority, for example, can be carried out.

Further, as described above with reference to FIG. 8 for example, prior to or during starting up of the programs corresponding to the copy function, the program starting up control part 110 may suspend the starting up of the programs corresponding to the copy function, and start up the programs corresponding to the facsimile function. Thereby, it is possible to start up the programs corresponding to the facsimile function earlier in priority, and to carry out a starting up operation according to a user's needs to use a specific function with priority for example. It is noted that, starting up of the programs which are suspended recommences at an appropriate time and from a position at which starting up was suspended. For example, the starting up operation for the programs corresponding to the copy function that had been suspended may be recommenced during or after the starting up operation for the programs corresponding to the facsimile function.

Further, in a case where there are programs which are common among the pluralities of programs corresponding to the respective functions, the program starting up control part 110 may start up, in a lump, the common programs such as those included in a plurality of programs corresponding to one function. For example, in a case where "copy (1)", "facsimile (1)" and "printer (1)" depicted in FIG. 6 are such a common program, the program starting up control part 110 may start up the common program separately from the CMPs to which the common program originally belongs, with incorporating the common program into the framework CMP, or incorporating the common program to another function group. Thereby, it is possible to appropriately start up a function which works among respective functions, or a function which works in parallel with other functions.

Further, the program starting up control part 110 determines a function group to which an afterwards added program 170 belongs based on identification information which the program 170 has, the attribute information 150 and the starting up information 160 held by the HDD 240, and starts up the program 170 as a part of the thus-determined function group (CMP). Thereby, it is possible to reduce a starting up time of programs corresponding to a function to be performed with priority also for afterwards added programs.

In step S30 of FIG. 9, the image processing part 120 waits for a user's request for processing. Then, when receiving a user's request for processing from the display device 250 or such in step S40, the image processing part 120 determines whether the received user's request for processing includes a finish instruction. When the received user's request for processing includes a finish instruction (YES in step S50), the image processing part 120 finishes processing which the image processing part has been carrying out, in step S70.

On the other hand, when the received user's request for processing does not include a finish instruction but includes a request for carrying out image forming processing (NO in step S50), the image processing part 120 carries out the image forming processing. For example, when the received user's request for processing includes a request for performing the copy function, the image processing part 120 uses the scanner 260 to obtain image data of an original, and outputs the obtained image data to paper from the plotter 270. When the received user's request for processing includes a request for performing the facsimile function, the image processing part 120 uses the scanner 260, obtains image data of an original, and transmits the obtained image data to a designated destination from the communication I/F 280. When the received user's request for processing includes a request for performing the printer function, the image processing part 120 obtains image data from the communication I/F 20, and outputs the obtained image data to paper from the plotter 270.

By thus carrying out the above-mentioned processing, the image processing apparatus 100 in the embodiment can reduce a starting up time of the programs corresponding to a function to be performed with priority.

Thus, according to the embodiment, it is possible to provide an image processing apparatus, and a program starting up method, whereby a starting up time of programs corresponding to a function to be performed with priority can be reduced.

The present invention is not limited to the specifically disclosed embodiments, and variations and modifications may be made without departing from the scope of the present invention.

The present application is based on Japanese priority applications Nos. 2008-235685 and 2009-149202, filed Sep. 12, 2008 and Jun. 23, 2009, respectively, the entire contents of which are hereby incorporated herein by reference.

What is claimed is:

1. An image processing apparatus, comprising:
first through n-th pluralities of programs which, when executed by a computer processor, perform respectively first through n-th functions of the image processing apparatus, where n denotes an integer more than 1; and
a program starting up control part configured to start up, on a function-by-function basis, the first through n-th pluralities of programs respectively corresponding to the first through n-th functions, wherein the program starting up control part is configured to start up, in a predetermined sequence, respective programs included in any one plurality of programs among the first through n-th pluralities of programs to a state in which the plurality of programs performs a corresponding function, wherein:

the program starting up control part is configured to suspend starting up of programs included in one plurality of programs corresponding to one function among the first through n-th pluralities of programs during starting up of the programs included in the one plurality of programs corresponding to the one function, and to start up programs included in another plurality of programs corresponding to another function among the first through n-th pluralities of programs.

2. The image processing apparatus as claimed in claim 1, wherein:

the program starting up control part is configured to start up a program which is common to pluralities of programs among the first through n-th pluralities of programs, as a program of another plurality of programs among the first through n-th pluralities of programs, or as a program included in, a new plurality of programs for a new function.

3. The image processing apparatus as claimed in claim 1, further comprising:

a storage device storing attribute information of the programs of the first through n-th pluralities of programs, wherein:

each program of the first through n-th pluralities of programs has identification information used for identifying the program, and the program starting up control part is configured to identify, based on the attribute information and the identification information of a particular program, whether the particular program belongs to any function of the first through n-th functions.

4. An image processing apparatus, comprising:

first through n-th pluralities of programs which, when executed by a computer processor, perform respectively first through n-th functions of the image processing apparatus, where n denotes an integer more than 1; and a program starting up control part configured to start up, on a function-by-function basis, the first through n-th pluralities of programs respectively corresponding to the first through n-th functions, wherein the program starting up control part is configured to start up, in a predetermined sequence, respective programs included in any one plurality of programs among the first through n-th pluralities of programs to a state in which the plurality of programs performs a corresponding function, wherein:

the program starting up control part is configured to start up, as a single process, the programs included in any one plurality of programs among the first through n-th pluralities of programs.

5. A program starting up method, comprising:

starting up first through n-th pluralities of programs which, when executed by a computer processor, perform respectively first through n-th functions of the image processing apparatus, where n denotes an integer more than 1, wherein the starting up starts up, on a function-by-function basis, the first through n-th pluralities of programs respectively corresponding to the first through n-th functions, wherein the starting up starts up, in a predetermined sequence, respective programs included in any one plurality of programs among the first through n-th pluralities of programs to a state in which the plurality of programs performs a corresponding function, the program starting up method, further comprising:

suspending starting up of programs included in one plurality of programs corresponding to one function among the first through n-th pluralities of programs during starting up of the programs included in the one plurality of programs corresponding to the one function; and starting up programs included in another plurality of programs corresponding to another function among the first through n-th pluralities of programs.

6. The program starting up method as claimed in claim 5, wherein:

the starting up starts up a program which is common to pluralities of programs among the first through n-th pluralities of programs, as a program of another plurality of programs among the first through n-th pluralities of programs, or as a program included in a new plurality of programs for a new function.

7. The program starting up method as claimed in claim 5, further comprising:

storing attribute information of the programs of the first through n-th pluralities of programs, wherein:

each program of the first through n-th pluralities of programs has identification information used for identifying the program, and the starting up identifies, based on the attribute information and the identification information of a particular program, whether the particular program belongs to any function of the first through n-th functions.

8. The program starting up method as claimed in claim 5, wherein:

the starting up starts up, as a single process, the programs included in any one plurality of programs among the first through n-th pluralities of programs.

\* \* \* \* \*